US012657019B2

(12) United States Patent
Baker et al.

(10) Patent No.: US 12,657,019 B2
(45) Date of Patent: Jun. 16, 2026

(54) SYSTEMS AND METHODS FOR SOFTWARE DISTRIBUTION

(71) Applicant: Palantir Technologies Inc., Denver, CO (US)

(72) Inventors: Alexandra Baker, Los Altos, CA (US); Christopher Male, Menlo Park, CA (US)

(73) Assignee: Palantir Technologies Inc., Aventura, FL (US)

( * ) Notice: Subject to any disclaimer, the term of this patent is extended or adjusted under 35 U.S.C. 154(b) by 74 days.

(21) Appl. No.: 18/143,427

(22) Filed: May 4, 2023

(65) Prior Publication Data

US 2023/0359452 A1      Nov. 9, 2023

Related U.S. Application Data

(60) Provisional application No. 63/338,681, filed on May 5, 2022.

(51) Int. Cl.
*G06F 8/61* (2018.01)
*G06F 8/41* (2018.01)
(Continued)

(52) U.S. Cl.
CPC .................. *G06F 8/65* (2013.01); *G06F 8/71* (2013.01); *G06F 8/31* (2013.01); *G06F 8/41* (2013.01);
(Continued)

(58) Field of Classification Search
CPC ..... G06F 8/65; G06F 8/71; G06F 8/61; G06F 8/41; G06F 8/658; G06F 8/53; G06F 8/654; G06F 8/31
See application file for complete search history.

(56) References Cited

U.S. PATENT DOCUMENTS

| | | | | |
|---|---|---|---|---|
| 9,471,304 | B1 * | 10/2016 | Fuchs | ....................... G06F 8/71 |
| 12,192,273 | B1 * | 1/2025 | Pandurangarao | ... H04L 67/1021 |

(Continued)

OTHER PUBLICATIONS

Lilliput: Minified Software Patches blog, published May 13, 2019, <https://blog.palantir.com/lilliput-minified-software-patches-ed4028242a5>.

*Primary Examiner* — Anibal Riveracruz
(74) *Attorney, Agent, or Firm* — Faegre Drinker Biddle & Reath LLP

(57)      ABSTRACT

Systems and methods for software distribution are disclosed. For example, the method includes: receiving a first deployment package for a first version of software; recursively disassembling the first deployment package into a plurality of components; accessing a set of second components of a second deployment package for a second version of the software; generating one or more component differentiations based at least in part upon the plurality of components associated with the first deployment package and the set of second components of the second deployment package, a first component differentiation of the one or more component differentiations being a difference between a first component associated with the first deployment package and a second component in the disassembled components of the second deployment package; and generating a distribution package based on the one or more component differentiations and a package structure associated with a component structure of the first deployment package.

14 Claims, 5 Drawing Sheets

(51) Int. Cl.

| | | |
|---|---|---|
| *G06F 8/53* | (2018.01) | |
| *G06F 8/65* | (2018.01) | |
| *G06F 8/71* | (2018.01) | |
| *G06F 8/30* | (2018.01) | |
| *G06F 8/654* | (2018.01) | |
| *G06F 8/658* | (2018.01) | |

(52) U.S. Cl.
CPC ................ *G06F 8/53* (2013.01); *G06F 8/654*
(2018.02); *G06F 8/658* (2018.02)

(56) References Cited

U.S. PATENT DOCUMENTS

| | | | |
|---|---|---|---|
| 2008/0071806 A1 | 3/2008 | Gaurav et al. | |
| 2010/0088676 A1 | 4/2010 | Yuan et al. | |
| 2012/0144380 A1* | 6/2012 | Rabeler | G06F 8/658 |
| | | | 717/170 |
| 2013/0047138 A1* | 2/2013 | Radez | G06F 8/61 |
| | | | 717/121 |
| 2020/0379752 A1* | 12/2020 | Rodrigues Rosa Junior | |
| | | | G06F 16/9014 |
| 2021/0004223 A1* | 1/2021 | Von Borany | G06F 8/658 |
| 2021/0311725 A1* | 10/2021 | Ren | G06F 8/658 |
| 2022/0229656 A1* | 7/2022 | Moran | G06F 8/61 |
| 2022/0269499 A1* | 8/2022 | Kadam | G06F 8/71 |
| 2023/0093197 A1* | 3/2023 | Graham | G06F 8/53 |
| | | | 717/140 |

* cited by examiner

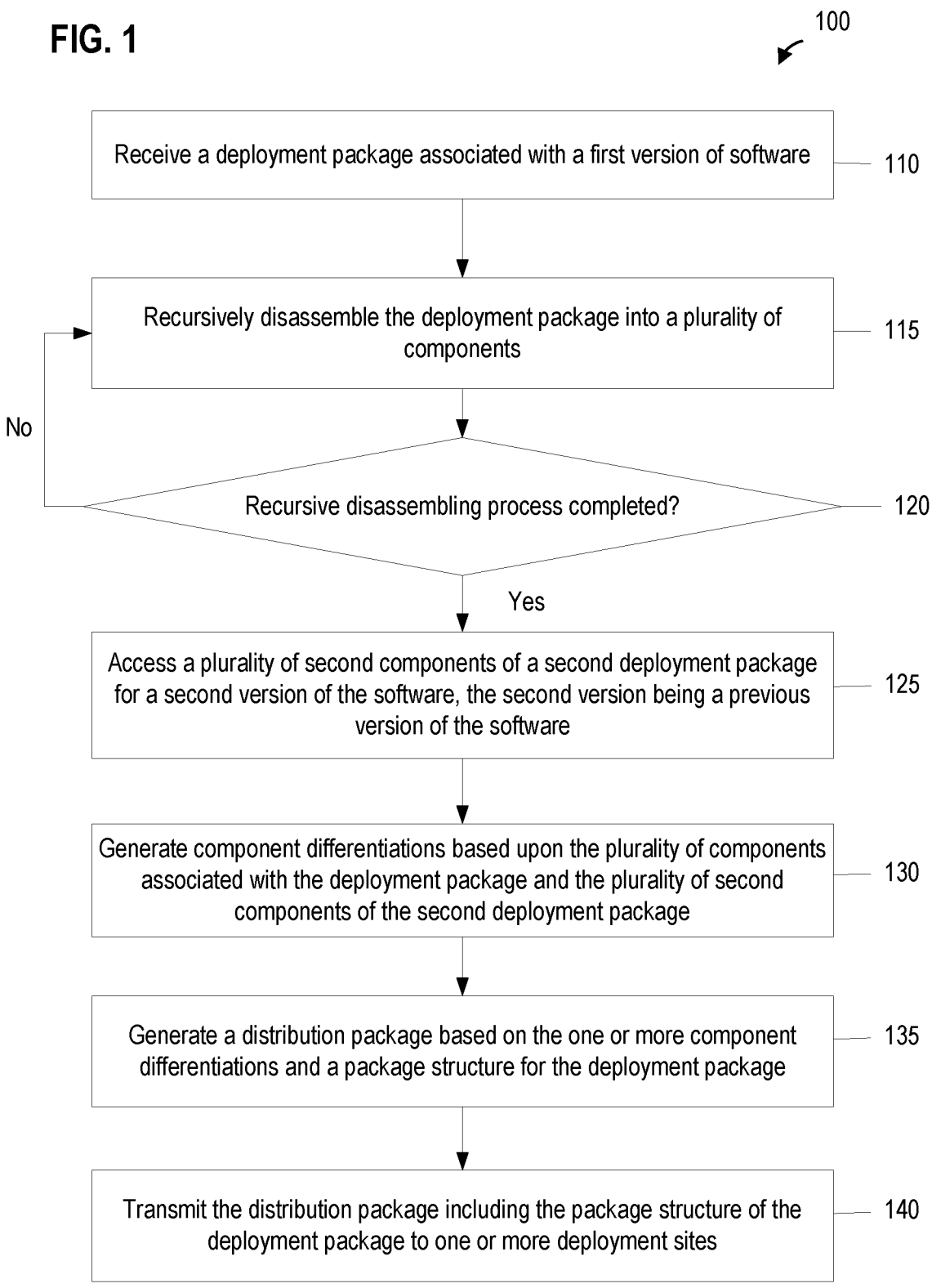

Receive a deployment package associated with a first version of software — 110

Recursively disassemble the deployment package into a plurality of components — 115

No

Recursive disassembling process completed? — 120

Yes

Access a plurality of second components of a second deployment package for a second version of the software, the second version being a previous version of the software — 125

Generate component differentiations based upon the plurality of components associated with the deployment package and the plurality of second components of the second deployment package — 130

Generate a distribution package based on the one or more component differentiations and a package structure for the deployment package — 135

Transmit the distribution package including the package structure of the deployment package to one or more deployment sites — 140

FIG. 2

 200

Receive, at a first deployment site, a software distribution package including one or more component differentiations and a package structure — 210

Identify, by a computing device, one or more missing and/or corrupted components associated with the software distribution package — 215

Receive, by the computing device, deployment information across a plurality of deployment sites — 220

Select, by the computing device, a second deployment site from the plurality deployment sites based on the deployment information and the first deployment site — 225

Request, by the computing device, one or more components for deployment from the second deployment site — 230

Receive, at the first deployment site, one or more components from the second deployment site — 235

Using the one or more received components, the one or more component differentiations, and the package structure, deploy the software distribution package at the first deployment site — 240

SYSTEMS AND METHODS FOR SOFTWARE DISTRIBUTION

CROSS REFERENCE TO RELATED APPLICATION

This application claims priority to U.S. Provisional Application No. 63/338,681, filed May 5, 2022, which is incorporated by reference herein in its entirety for all purposes.

TECHNICAL FIELD

Certain embodiments of the present disclosure are directed to systems and methods for software distribution. More particularly, some embodiments of the present disclosure provide systems and methods for software distribution to various deployment environments.

BACKGROUND

A deployment environment refers to an environment in which a software runs. In many cases, many deployment environments for a certain software are disconnected from one another, and some of the environments may even be running outdated versions of the software, making it a challenge to distribute software in an efficient and effective manner to all the environments.

Hence, it is desirable to improve the techniques for software distribution.

SUMMARY

Certain embodiments of the present disclosure are directed to systems and methods for software distribution. More particularly, some embodiments of the present disclosure provide systems and methods for software distribution to various deployment environments.

According to some embodiments, a method for software distribution includes: receiving a first deployment package for a first version of software; recursively disassembling the first deployment package into a plurality of components; accessing a set of second components of a second deployment package for a second version of the software, the second version of the software being a previous version of the software; generating one or more component differentiations based at least in part upon the plurality of components associated with first deployment package and the set of second components of the second deployment package, a first component differentiation of the one or more component differentiations being a difference between a first component associated with the first deployment package and a second component in the set of disassembled components of the second deployment package; and generating a distribution package based on the one or more component differentiations and a package structure, the package structure associated with a component structure of the first deployment package. The method is performed using one or more processors.

According to some embodiments, a method for software distribution includes: receiving, at a first deployment site, a software distribution package including one or more component differentiations and a package structure; identifying, by the computing device, one or more missing components associated with the software distribution package; receiving, at the first deployment site, deployment information across a plurality of deployment sites; selecting, by the computing device, a second deployment site from the plurality of deployment sites based at least in part upon the deployment information across the plurality of deployment sites and the first deployment site; requesting one or more components from the second deployment site; receiving, at the first deployment site, the one or more requested components from the second deployment site; and deploying the software distribution package at the first deployment site, using the one or more received components from the second deployment site, the one or more component differentiations, and the package structure. The method is performed using one or more processors.

According to certain embodiments, a system for software distribution includes one or more memories having instructions stored therein, and one or more processors configured to execute the instructions and perform operations. The operations include: receiving a first deployment package for a first version of software; recursively disassembling the first deployment package into a plurality of components; accessing a set of second components of a second deployment package for a second version of the software, the second version of the software being a previous version of the software; generating one or more component differentiations based at least in part upon the plurality of components associated with first deployment package and the set of second components of the second deployment package, a first component differentiation of the one or more component differentiations being a difference between a first component associated with the first deployment package and a second component in the set of disassembled components of the second deployment package; and generating a distribution package based on the one or more component differentiations and a package structure, the package structure associated with a component structure of the first deployment package.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

The accompanying drawings are incorporated in and constitute a part of this specification and, together with the description, explain the features and principles of the disclosed embodiments. In the drawings, FIG. 1 is a simplified diagram showing a method for software distribution according to certain embodiments of the present disclosure;

FIG. 2 is a simplified diagram showing a method for software distribution according to certain embodiments of the present disclosure;

DETAILED DESCRIPTION

Figure 3:
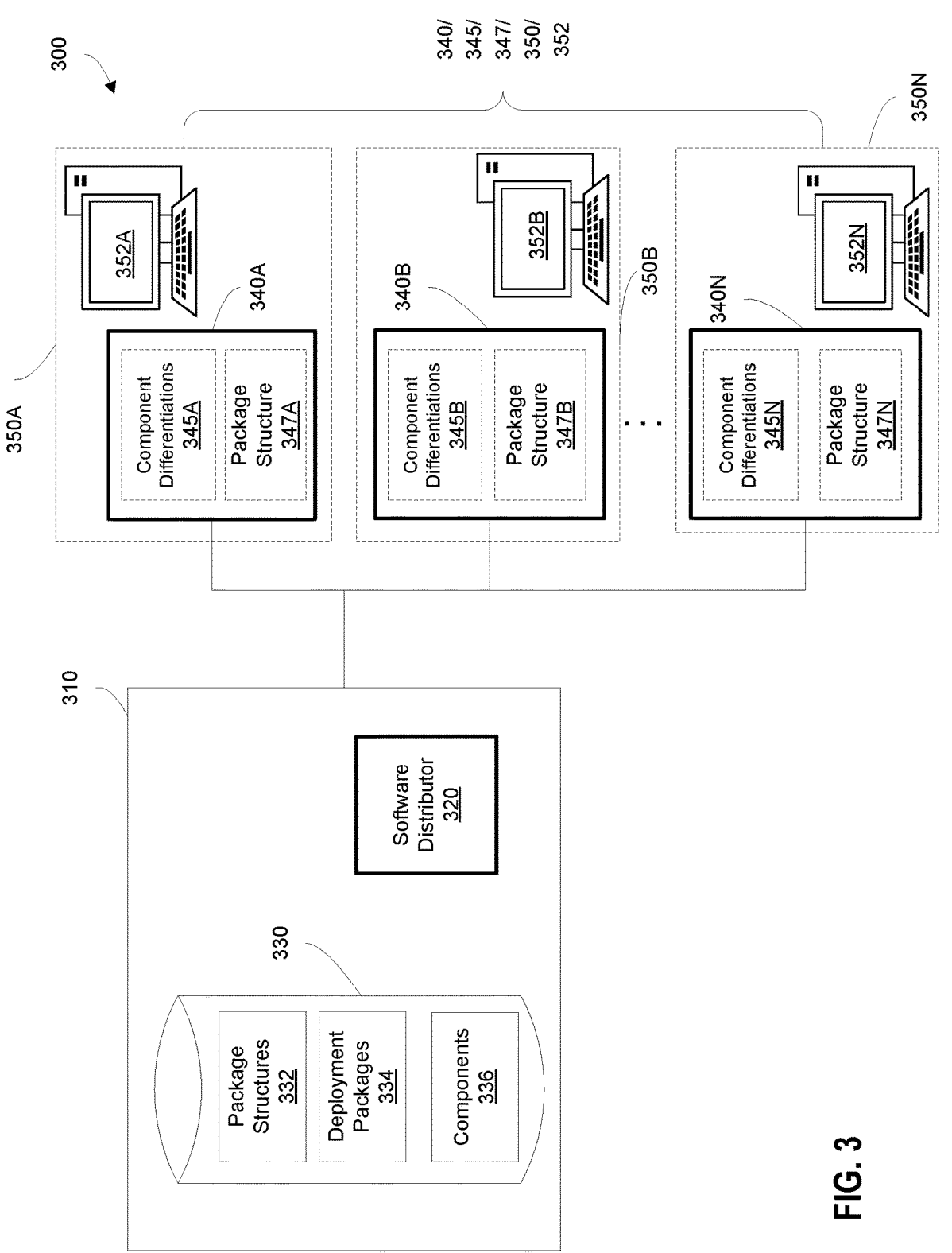
FIG. 3 depicts an illustrative diagram of a software distribution environment, in accordance with certain embodiments of the present disclosure.

Conventional systems and methods are often not capable of reliably updating software installed on hardware in different environments, especially environments which may not be optimal for receiving data transmissions that are necessary for such software updates. In such cases, depending on the environmental factors, the transmitted data may be corrupted or take a long time to download due to reduced download speed. If the incorrect update was downloaded, e.g., if the update was for a wrong version of the software or even different software entirely, the download must start over, resulting in a loss of time and increased frustration in the users. In some situations, the environment may even be disconnected from the network (i.e., no public Internet connection is available) in which case the update may only be delivered physically on physical media such as CDs (compact discs) and DVDs (digital video discs), and resending such physical media in case of error may result in an even greater loss of time.

Various embodiments of the present disclosure can achieve benefits and/or improvements by systems and methods for software distribution to various deployment environments (e.g., disconnected environments). In some embodiments, benefits include significant improvements in, for example, accuracy of identifying the specific version of the software installed on each hardware such that the correct update (e.g., a newer version of the software) can be deployed and installed on the hardware for a proper upgrade. In certain embodiments, benefits include the capability of reducing the data size of the package that is to be distributed as a result, for example making it smaller than the data size of the package that is deployed. In some embodiments, smaller data size allows for a quicker data transmission for the deployed package to reach its destination. In some embodiments, benefits also include the capability of identifying missing components such as components whose data may have been corrupted in an environment, as well as to correct the missing or corrupt components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, from another software component in a same software. In certain embodiments, the term "access" or "accessing" means retrieving data or information, and/or generating data or information.

At least some embodiments of the present disclosure are directed to systems and methods for software distribution to various deployment environments (e.g., disconnected environments). As used herein, a deployment environment refers to an environment in which the software runs. In certain embodiments, the software distribution systems are configured to recursively disassemble a deployment package into a plurality of components (e.g., 10 components, 1000 components, 10,000 components, 1,000,000 components, etc.) until reaching a predetermined level. As used herein, a deployment package is configured to upgrade a piece of software to a specific version (e.g., a newer version). In some embodiments, a deployment package includes a package structure (e.g., a tree structure, a file structure) providing component relationships among components in the deployment package. In certain embodiments, component relationships include parent-child relationships (e.g., a parent component including two or more child components, e.g., a library including two or more components, etc.), linking relationships (e.g., one component being dynamically linked to another component, one component being statically linked to another component), and/or the like.

In some embodiments, the software distribution systems are configured to recursively disassemble a deployment package into unpackable components, also referred to as atom components. As used herein, an atom component refers to a component not having a child component (e.g., ".class" file in Java language). In some embodiments, a component, also referred to as a software component, refers to a software unit that has one or more predefined functionalities (e.g., a software module, an application software, a software library, etc.). In certain embodiments, the software distribution systems are configured to compare the disassembled components in a deployment package with corresponding components in a previous deployment package to generate component differentiations. As used herein, a component differentiation is a difference between the current version of the component and a previous version of the component, or a new component. In some embodiments, the software distribution systems are configured to generate a distribution package based on one or more component differentiations and the package structure. In certain embodiments, the size of the distribution package is smaller than the size of the deployment package. For example, the size of the distribution package is less than one-half of the size of the deployment package. As an example, the size of the distribution package is less than one-fifth of the size of the deployment package.

At least certain embodiments of the present disclosure are directed to systems and methods for software distribution that are configured to identify one or more missing components in a first deployment environment and select the one or more missing components in a second deployment environment based on one or more criteria. As used herein, a missing component is a component not existing in an environment (e.g., in a data repository, in a code repository, in a cache) or a component being corrupted in an environment. In some embodiments, the one or more criteria include evaluations of one or more factors including a network distance, a network bandwidth, a network latency, a geographic location, a geographic range, a resource availability, and/or the like. In certain embodiments, the systems and methods of the present disclosure can reduce network usage by distributing a smaller package. In some embodiments, the systems and methods of the present disclosure can reduce network usage by selecting a deployment environment to distribute missing components.

FIG. 1 is a simplified diagram showing a method 100 for software distribution according to certain embodiments of the present disclosure. This diagram is merely an example. One of ordinary skill in the art would recognize many variations, alternatives, and modifications. The method 100 for software distribution includes processes 110, 115, 120, 125, 130, 135, and 140. Although the above has been shown using a selected group of processes for the method 100 for software distribution, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 100 are performed by a system (e.g., the computing system 500). In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 110, the software distribution system (e.g., the software distribution system 310 in FIG. 3) is configured to receive a deployment package associated with a version of software (e.g., Software A version 2.0). In certain examples, the software distribution system is a software distribution device. In certain embodiments, the deployment package includes a package structure of the deployment package. In some embodiments, the package structure includes and/or represents a component structure (e.g., a hierarchical component structure) of the deployment package. In certain examples, the package structure includes a tree structure representing the component structure. In some embodiments, the component structure is a hierarchical structure including a plurality of component levels. In certain embodiments, the plurality of component levels includes a first level (e.g., a first software library) and a second level (e.g., a second software library, and a class file in Java language). In some embodiments, the plurality of component levels includes a second level (e.g., level 2, a child level) corresponding to a plurality of child components of one or more parent components corresponding to a first level (e.g., level 1, a parent level). In some embodiments, the package structure is stored in a repository (e.g., the repository 330 in FIG. 3). In some embodiments, the package structure is extracted and/or generated based upon recursively disassembling the deployment package as discussed below.

According to certain embodiments, at the process 115, the software distribution system is configured to recursively disassemble the deployment package into a plurality of components. In some embodiments, at the process 120, the software distribution system is configured to check whether the recursive disassembling process is completed. In certain embodiments, the recursive disassembling process is completed when a predefined disassembling level is reached. As used herein, a disassembling level refers to a component level, for example, an unpackable component level. In some examples, an unpackable component level refers to the plurality of components are unpackable components. In some embodiments, the package structure of the deployment package is a tree structure. In certain embodiments, the unpackable component, also referred to as an atom component, refers to a component at a leaf node of the tree structure and the unpackage component level. In some embodiments, the package structure is a hierarchical structure of components in parent-child relationships. In certain embodiments, the unpackable component refers to a component not having a child component in the hierarchical structure. In some embodiments, the recursive disassembling process is completed when an unpackable disassembling level is reached.

In some embodiments, the software distribution system is configured to disassemble the deployment package into one or more first level components (e.g., a software module, a software library). In certain embodiments, the software distribution system is configured to disassemble at least one first level component of the one or more first level components into one or more second level components (e.g., a secondary software library). In some embodiments, at least one second level component of the one or more second level components is a child component of the at least one first level component. In certain embodiments, each second level component of the one or more second level components is a child component of the at least one first level component. In some embodiments, the software distribution system is configured to disassemble at least one of the one or more second level components into one or more atom components. In certain embodiments, each atom component of the one or more atom components does not have a child component. In some embodiments, the package structure is generated during the recursive dissembling process. In certain embodiments, the package structure is updated during each iteration of dissembling process.

According to some embodiments, at the process 125, the software distribution system is configured to access a plurality of second components (e.g., a set of second components) of a second deployment package for a second version of the software, the second version being a previous version (e.g., Software A version 1.0) of the first version of the software (e.g., Software A version 2.0). In certain embodiments, the software distribution system is configured to access the plurality of second components of the second version of the software from a repository (e.g., the repository 330 in FIG. 3). In some embodiments, the software distribution system is configured to disassemble the second deployment package into the set of second components. In certain embodiments, the set of second components are at the unpackable component level. In some embodiments, the set of second components are at the predefined component level that is the same component level as the plurality of components disassembled for the deployment package for the first version of the software.

According to certain embodiments, at the process 130, the software distribution system is configured to generate component differentiations based upon the plurality of components associated with the deployment package and the plurality of second components of the second deployment package. In some embodiments, a first component differentiation of the one or more component differentiations is a difference between a first component associated with the first deployment package and a second component in the set of second components of the second deployment package. In certain embodiments, a second component differentiation of the one or more component differentiations is a new component in the plurality of components associated with the first deployment package, wherein the new component is not in the set of second components of the second deployment package. In some embodiments, the one or more component differentiations include one or more new components and one or more component differences.

According to some embodiments, at the process 135, the software distribution system is configured to generate a distribution package based on the one or more component differentiations and the package structure of the deployment package. In certain embodiments, the package structure of the deployment package is different from the package structure of the second deployment package associated with the second version of the software. In some embodiments, the distribution package includes the one or more component differentiations and the package structure of the deployment package. In certain embodiments, the size of the distribution package is smaller than the size of the deployment package. In some embodiments, the size of the distribution package is smaller than one-half of the size of the deployment package. In certain embodiments, the size of the distribution package is smaller than one-third of the size of the deployment package. In some embodiments, the size of the distribution package is smaller than one-tenth of the size of the deployment package.

According to certain embodiments, at the process 140, the software distribution system is configured to transmit the distribution package including the package structure of the deployment package to one or more deployment sites. In some embodiments, the software distribution system is configured to transmit the distribution package to a deployment site at a request received from the deployment site. In certain embodiments, the software distribution system is configured to transmit the distribution package to a plurality of deployment sites at a time duration (e.g., push). In certain embodiments, the method 100 can reduce network usage by distributing a smaller package.

FIG. 2 is a simplified diagram showing a method 200 for software distribution according to certain embodiments of the present disclosure. This diagram is merely an example. One of ordinary skill in the art would recognize many variations, alternatives, and modifications. The method 200 for software distribution includes processes 210, 215, 220, 225, 230, 235, and 240. Although the above has been shown using a selected group of processes for the method 200 for software distribution, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 200 are performed by a system (e.g., the computing system 600). In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 210, a computing device at a first deployment site (e.g., the computing device 352A in FIG. 3) is configured to receive a software distribution package including one or more component differentiations and a package structure, for example, a package structure associated with a deployment package of a version of software (e.g., Software A version 2.0). In certain embodiments, the package structure is a tree structure. In certain embodiments, the package structure is a hierarchical structure.

According to certain embodiments, at the process 215, the computing device (e.g., the software distribution system 310 in FIG. 3, the computing device 352A in FIG. 3) is configured to identify one or more missing components associated with the software distribution package. In some embodiments, at least one of the one or more missing components is a component not existing in a repository (e.g., the repository 454A in FIG. 4, the cache 456A in FIG. 4) at the first deployment site. In certain embodiments, at least one of the one or more missing components is a corrupted component in the repository at the first deployment site. In some examples, a corrupted component is not functional (e.g., virus affected). In certain examples, In certain embodiments, at least one of the one or more missing components is a component (e.g., a specific version of the component, Component B version 5.0) not available in the repository at the first deployment site. In some embodiments, the computing device is configured to identify the one or more missing components associated with the software distribution package based at least in part upon the package structure. In certain embodiments, at least one of the one or more missing components is not a component associated with the one or more component differentiations. For example, a missing component is a component that is not changed by this deployment.

According to some embodiments, at the process 220, the computing device receives deployment information across a plurality of deployment sites. In some embodiments, the deployment information including a network position of a site, a network bandwidth of a site, a network speed of a site or between two sites, a geographic location of a site, a geographic range of a site, a resource availability (e.g., component availability) of a site, and/or the like. According to some embodiments, at the process 225, the computing device selects a second deployment site from the plurality deployment sites based on the deployment information and the first deployment site. In certain embodiments, the second deployment site is selected based upon one or more selection criteria. In some embodiments, the one or more selection criteria include at least one selected from a group consisting of a network latency, a network bandwidth, a network speed, a geographic location, a geographic range, and a resource availability. In certain embodiments, the second deployment site is a site having at least one of the one or more identified missing components and the lowest network latency. In some embodiments, the second deployment site is a site within a certain geographic area (e.g., a certain region, a certain country, etc.)

In some embodiments, the one or more selection criteria include evaluations of one or more factors including a network distance, a network bandwidth, a network latency, a geographic location, a geographic range, a resource availability, and/or the like. In certain embodiments, the resource availability includes availability of a part of the one or more missing components. In some embodiments, the resource availability refers to availability of all of the one or more missing components.

According to certain embodiments, at the process 230, the computing device, for example, the computing device requests one or more components for deployment from the second deployment site. In some embodiments, the one or more requested components from the second deployment site is a subset of the one or more missing components. In certain embodiments, at least one of the one or more missing components is not one of the one or more requested components. In some embodiments, the one or more request components are the same as the one or more missing components.

According to some embodiments, at the process 235, the computing device at the first deployment site receives one or more components from the second deployment site. In certain embodiments, the one or more received components are the same as the one or more requested components. In some embodiments, the one or more received components are different from the one or more requested components. In certain embodiments, at least one of the one or more requested components is not in the one or more received components.

In certain embodiments, the method 200 can reduce network usage by selecting a deployment environment to distribute missing components. According to some embodiments, the computing device deploys the software distribution package at the first deployment site, using the one or more received components from the second deployment site, the one or more component differentiations, and the package structure.

FIG. 3 depicts an illustrative diagram of a software distribution environment 300, in accordance with certain embodiments of the present disclosure. FIG. 3 is merely an example. One of the ordinary skilled in the art would recognize many variations, alternatives, and modifications. According to certain embodiments, the software distribution environment 300 includes a software distribution system 310 and one or more software deployment sites 350 (e.g., software deployment site 350A, software deployment site 350B, . . . , software deployment site 350N). According to some embodiments, the software distribution system 310 includes a software distributor 320 (e.g., a software module and/or a hardware module) and one or more memories (i.e., repositories) 330, also refers to as a repository 330. In certain embodiments, the repository 330 includes one or more package structures repository 332 for storing package structures, one or more deployment packages repository 334 for storing deployment packages, and/or one or more components repository 336 for storing components (e.g., software components, etc.). Although the above has been shown using a selected group of components in the software distribution environment 300, there can be many alternatives, modifications, and variations. For example, some of the components may be expanded and/or combined. Other components may be inserted into those noted above.

Depending upon the embodiment, the arrangement of components may be interchanged with others replaced. Further details of these components are found throughout the present disclosure.

According to some embodiments, the software distribution system 310 and/or the software distributor 320 is configured to receive a deployment package associated with a version of software (e.g., Software A version 2.0). In certain examples, the software distribution system is a software distribution device. In certain embodiments, the deployment package includes a package structure of the deployment package. In some embodiments, the package structure includes and/or represents a component structure (e.g., a hierarchical component structure) of the deployment package. In certain examples, the package structure includes a tree structure representing the component structure. In some embodiments, the component structure is a hierarchical structure including a plurality of component levels. In certain embodiments, the plurality of component levels includes a first level (e.g., a first software library) and a second level (e.g., a second software library, and a class file in Java language). In some embodiments, the plurality of component levels includes a second level (e.g., level 2, a child level) corresponding to a plurality of child components of one or more parent components corresponding to a first level (e.g., level 1, a parent level). In some embodiments, the package structure is stored in a repository, for example, in the package structures repository 332 and/or the repository 330. In some embodiments, the package structure is extracted and/or generated based upon recursively disassembling the deployment package as discussed below.

According to certain embodiments, the software distribution system 310 and/or the software distributor 320 is configured to recursively disassemble the deployment package into a plurality of components. In some embodiments, the software distribution system 310 and/or the software distributor 320 is configured to check whether the recursive disassembling process is completed. In certain embodiments, the recursive disassembling process is completed when a predefined disassembling level is reached. As used herein, a disassembling level refers to a component level, for example, an unpackable component level. In some examples, an unpackable component level refers to the plurality of components are unpackable components. In some embodiments, the package structure of the deployment package is a tree structure. In certain embodiments, the unpackable component, also referred to as an atom component, refers to a component at a leaf node of the tree structure and the unpackage component level. In some embodiments, the package structure is a hierarchical structure of components in parent-child relationships. In certain embodiments, the unpackable component refers to a component not having a child component in the hierarchical structure. In some embodiments, the recursive disassembling process is completed when an unpackable disassembling level is reached.

In some embodiments, the software distribution system 310 and/or the software distributor 320 is configured to disassemble the deployment package into one or more first level components (e.g., a software module, a software library). In certain embodiments, the software distribution system 310 and/or the software distributor 320 is configured to disassemble at least one first level component of the one or more first level components into one or more second level components (e.g., a secondary software library). In some embodiments, at least one second level component of the one or more second level components is a child component of the at least one first level component. In certain embodiments, each second level component of the one or more second level components is a child component of the at least one first level component. In some embodiments, the software distribution system 310 and/or the software distributor 320 is configured to disassemble at least one of the one or more second level components into one or more atom components. In certain embodiments, each atom component of the one or more atom components does not have a child component. In some embodiments, the package structure is generated during the recursive dissembling process. In certain embodiments, the package structure is updated during each iteration of dissembling process.

According to some embodiments, the software distribution system 310 and/or the software distributor 320 is configured to access a plurality of second components (e.g., a set of second components) of a second deployment package for a second version of the software, the second version being a previous version (e.g., Software A version 1.0) of the first version of the software (e.g., Software A version 2.0). In certain embodiments, the software distribution system is configured to access the plurality of second components of the second version of the software from the repository 330 in FIG. 3. In some embodiments, the software distribution system 310 and/or the software distributor 320 is configured to disassemble the second deployment package into the set of second components. In certain embodiments, the set of second components are at the unpackable component level. In some embodiments, the set of second components are at the predefined component level that is the same component level as the plurality of components disassembled for the deployment package for the first version of the software.

According to certain embodiments, the software distribution system 310 and/or the software distributor 320 is configured to generate component differentiations based upon the plurality of components associated with the deployment package and the plurality of second components of the second deployment package. In some embodiments, a first component differentiation of the one or more component differentiations is a difference between a first component associated with the first deployment package and a second component in the set of second components of the second deployment package. In certain embodiments, a second component differentiation of the one or more component differentiations is a new component in the plurality of components associated with the first deployment package, wherein the new component is not in the set of second components of the second deployment package. In some embodiments, the one or more component differentiations include one or more new components and one or more component differences.

According to some embodiments, the software distribution system 310 and/or the software distributor 320 is configured to generate one or more distribution packages 340 (e.g., distribution package 340A, distribution package 340B, . . . , distribution package 340N) based on the one or more component differentiations and the package structure of the deployment package. In certain embodiments, the package structure of the deployment package is different from the package structure of the second deployment package associated with the second version of the software (e.g., an older version of the software). In some embodiments, the distribution package 340 (e.g., distribution package 340A, distribution package 340B, . . . , distribution package 340N) includes the one or more component differentiations 345 (e.g., component differentiation 345A, component differentiation 345B, . . . , component differentiation 345N) and the package structures 347 of the distribution package (e.g., the package structure 347A, the package structure 347B, . . . , the package structure 347N). In certain embodiments, the distribution package 340A is different from the distribution package 340B. In some embodiments, the distribution package 340A is the same as the distribution package 340B. In certain embodiments, the size of the distribution package 340 is smaller than the size of the deployment package. In some embodiments, the size of the distribution package is smaller than one-half of the size of the deployment package. In certain embodiments, the size of the distribution package is smaller than one-third of the size of the deployment package. In some embodiments, the size of the distribution package is smaller than one-tenth of the size of the deployment package.

According to certain embodiments, the software distribution system 310 and/or the software distributor 320 is configured to transmit the distribution package including the package structure of the deployment package to one or more deployment sites. In some embodiments, the software distribution system 310 and/or the software distributor 320 is configured to transmit the distribution package 340 to a deployment site 350 at a request received from the deployment site. In certain embodiments, the software distribution system 310 and/or the software distributor 320 is configured to transmit the distribution package 340 to a plurality of deployment sites 350 at a time duration (e.g., push). In certain embodiments, the software distribution method in the environment 300 can reduce network usage by distributing a smaller package. In some embodiments, the one or more computing devices 352 (e.g., computing device 352A, computing device 352B, . . . , computing device 352N) run and/or deploy the corresponding software distribution packages 340 at the corresponding deployment sites 350.

In some embodiments, the repository 330 can include one or more package structures repository 332, one or more deployment packages repository 334 (e.g., one or more versions of software), one or more components repository 336, and/or the like. The repository 330 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the software distribution environment 300 can execute software or firmware stored in non-transitory computer-readable medium to implement various processing steps. Various components and processors of the software distribution environment 300 can be implemented by one or more computing devices, including but not limited to, circuits, a computer, a cloud-based processing unit, a processor, a processing unit, a microprocessor, a mobile computing device, and/or a tablet computer. In some cases, various components of the software distribution environment 300 (e.g., the software distribution system 310, the software distributor 320, the computing devices 352) can be implemented on a shared computing device. Alternatively, a component of the software distribution environment 300 can be implemented on multiple computing devices. In some implementations, various modules and components of the software distribution environment 300 can be implemented as software, hardware, firmware, or a combination thereof. In some cases, various components of the software distribution environment 300 can be implemented in software or firmware executed by a computing device.

Various components of the software distribution environment 300 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 4:
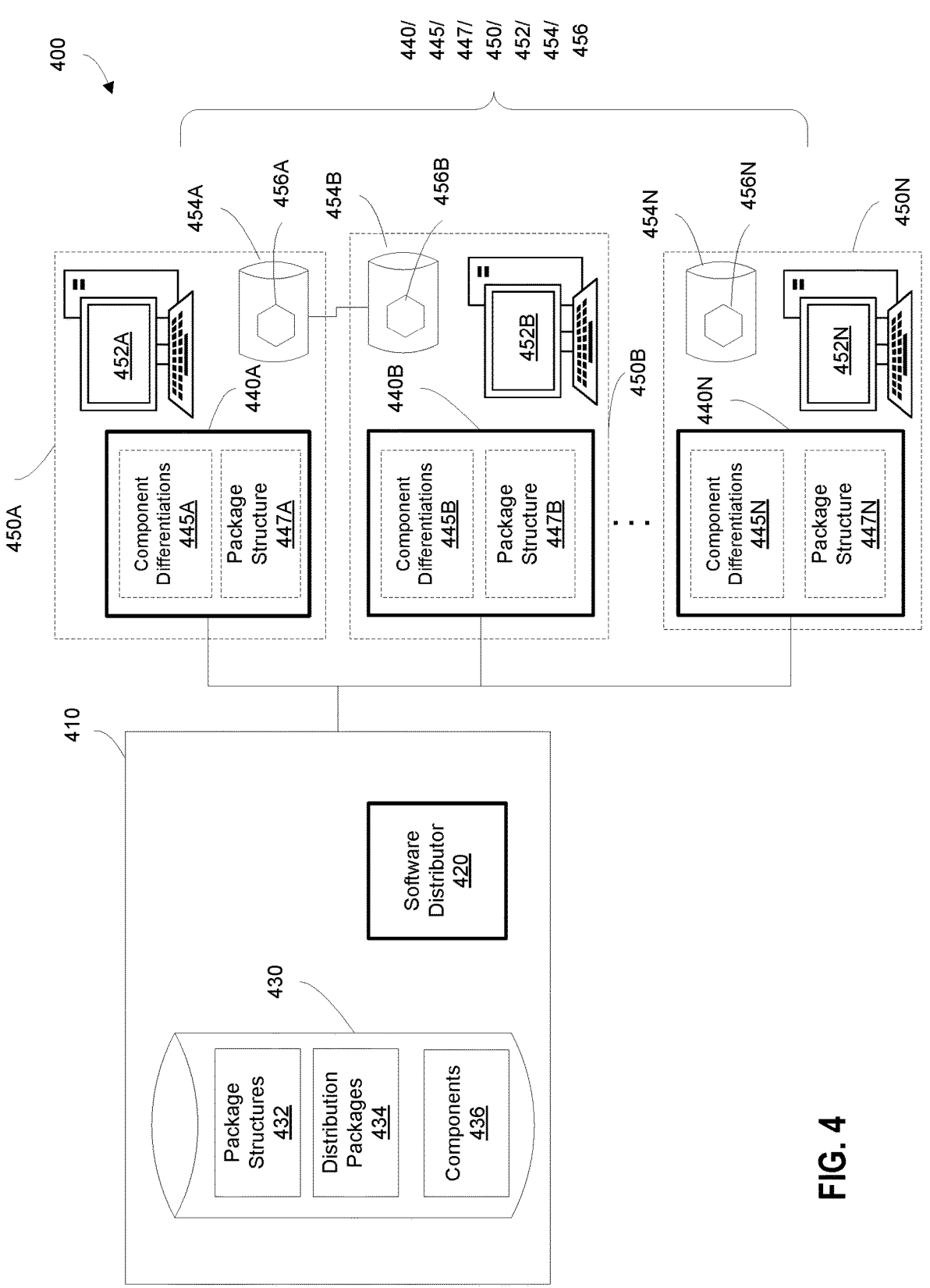
FIG. 4 depicts an illustrative diagram of a software distribution environment, according to certain embodiments of the present disclosure.

FIG. 4 is an illustrative example of a software distribution environment 400 with action validation, according to certain embodiments of the present disclosure. FIG. 4 is merely an example. One of the ordinary skilled in the art would recognize many variations, alternatives, and modifications. According to certain embodiments, the software distribution environment 400 includes a software distribution system 410 and one or more software deployment sites 450 (e.g., software deployment site 450A, software deployment site 450B, . . . , software deployment site 450N). According to some embodiments, the software distribution system 410 includes a software distributor 420 (e.g., a software module and/or a hardware module) and one or more memories 430, also refers to as a repository 430. In certain embodiments, the repository 430 includes one or more package structures repository 432 for storing package structures, one or more deployment packages repository 434 for storing deployment packages, and/or one or more components repository 436 for storing components (e.g., software components, etc.). Although the above has been shown using a selected group of components in the software distribution environment 400, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the software distribution system 410 and/or the software distributor 420 is configured to receive a deployment package associated with a version of software (e.g., Software A version 2.0). In certain examples, the software distribution system is a software distribution device. In certain embodiments, the deployment package includes a package structure of the deployment package. In some embodiments, the package structure includes and/or represents a component structure (e.g., a hierarchical component structure) of the deployment package. In certain examples, the package structure includes a tree structure representing the component structure. In some embodiments, the component structure is a hierarchical structure including a plurality of component levels. In certain embodiments, the plurality of component levels includes a first level (e.g., a first software library) and a second level (e.g., a second software library, and a class file in Java language). In some embodiments, the plurality of component levels includes a second level (e.g., level 2, a child level) corresponding to a plurality of child components of one or more parent components corresponding to a first level (e.g., level 1, a parent level). In some embodiments, the package structure is stored in a repository, for example, in the package structures repository 432 and/or the repository 430. In some embodiments, the package structure is extracted and/or generated based upon recursively disassembling the deployment package as discussed below.

According to certain embodiments, the software distribution system 410 and/or the software distributor 420 is configured to recursively disassemble the deployment package into a plurality of components. In some embodiments, the software distribution system 410 and/or the software distributor 420 is configured to check whether the recursive disassembling process is completed. In certain embodiments, the recursive disassembling process is completed when a predefined disassembling level is reached. As used herein, a disassembling level refers to a component level, for example, an unpackable component level. In some examples, an unpackable component level refers to the plurality of components are unpackable components. In some embodiments, the package structure of the deployment package is a tree structure. In certain embodiments, the unpackable component, also referred to as an atom component, refers to a component at a leaf node of the tree structure and the unpackage component level. In some embodiments, the package structure is a hierarchical structure of components in parent-child relationships. In certain embodiments, the unpackable component refers to a component not having a child component in the hierarchical structure. In some embodiments, the recursive disassembling process is completed when an unpackable disassembling level is reached.

In some embodiments, the software distribution system is configured to disassemble the deployment package into one or more first level components (e.g., a software module, a software library). In certain embodiments, the software distribution system is configured to disassemble at least one first level component of the one or more first level components into one or more second level components (e.g., a secondary software library). In some embodiments, at least one second level component of the one or more second level components is a child component of the at least one first level component. In certain embodiments, each second level component of the one or more second level components is a child component of the at least one first level component. In some embodiments, the software distribution system is configured to disassemble at least one of the one or more second level components into one or more atom components. In certain embodiments, each atom component of the one or more atom components does not have a child component. In some embodiments, the package structure is generated during the recursive dissembling process. In certain embodiments, the package structure is updated during each iteration of dissembling process.

According to some embodiments, the software distribution system 410 and/or the software distributor 420 is configured to access a plurality of second components (e.g., a set of second components) of a second deployment package for a second version of the software, the second version being a previous version (e.g., Software A version 1.0) of the first version of the software (e.g., Software A version 2.0). In certain embodiments, the software distribution system 410 and/or the software distributor 420 is configured to access the plurality of second components of the second version of the software from the repository 430. In some embodiments, the software distribution system 410 and/or the software distributor 420 is configured to disassemble the second deployment package into the set of second components. In certain embodiments, the set of second components are at the unpackable component level. In some embodiments, the set of second components are at the predefined component level that is the same component level as the plurality of components disassembled for the deployment package for the first version of the software.

According to certain embodiments the software distribution system 410 and/or the software distributor 420 is configured to generate component differentiations based upon the plurality of components associated with the deployment package and the plurality of second components of the second deployment package. In some embodiments, a first component differentiation of the one or more component differentiations is a difference between a first component associated with the first deployment package and a second component in the set of second components of the second deployment package. In certain embodiments, a second component differentiation of the one or more component differentiations is a new component in the plurality of components associated with the first deployment package, wherein the new component is not in the set of second components of the second deployment package. In some embodiments, the one or more component differentiations include one or more new components and one or more component differences.

According to some embodiments, the software distribution system 410 and/or the software distributor 420 is configured to generate one or more distribution packages 440 (e.g., distribution package 440A, distribution package 440B, . . . , distribution package 440N) based on the one or more component differentiations and the package structure of the deployment package. In certain embodiments, the package structure of the deployment package is different from the package structure of the second deployment package associated with the second version of the software (e.g., an older version of the software).

According to certain embodiments, the software distribution system 410 and/or the software distributor 420 is configured to transmit the distribution package 440 (e.g., distribution package 440A, distribution package 440B, . . . , distribution package 440N), to the corresponding deployment sites 450. IN some embodiments, the distribution packages 440 includes the one or more component differentiations 445 (e.g., component differentiation 445A, component differentiation 445B, . . . , component differentiation 445N) and the package structures 447 of the distribution package (e.g., the package structure 447A, the package structure 447B, . . . , the package structure 447N). In certain embodiments, the distribution package 440A is different from the distribution package 440B. In some embodiments, the distribution package 440A is the same as the distribution package 440B. In certain embodiments, the size of the distribution package 440 is smaller than the size of the deployment package. In some embodiments, the size of the distribution package is smaller than one-half of the size of the deployment package. In certain embodiments, the size of the distribution package is smaller than one-third of the size of the deployment package. In some embodiments, the size of the distribution package is smaller than one-tenth of the size of the deployment package.

According to some embodiments, the one or more software deployment sites 450 include a corresponding computing device 452 (e.g., computing device 452A, computing device 452B, . . . , computing device 452N), a corresponding repository 454 (e.g., repository 454A, repository 454B, . . . , repository 454N). In some embodiments, the one or more repositories 454 include a corresponding cache 456 (e.g., cache 456A, cache 456B, . . . , cache 456N).

According to certain embodiments, the software distribution system 410 and/or the software distributor 420 is configured to transmit the distribution package 440 including the package structure of the deployment package to one or more deployment sites. In some embodiments, the software distribution system 410 and/or the software distributor 420 is configured to transmit the distribution package 440 to a deployment site 450 at a request received from the deployment site. In certain embodiments, the software distribution system 410 and/or the software distributor 420 is configured to transmit the distribution package 440 to a plurality of deployment sites 450 at a time duration (e.g., push). In certain embodiments, the software distribution process in the environment 400 can reduce network usage by distributing a smaller package.

According to some embodiments, a computing device 452A at a first deployment site 450A is configured to receive a software distribution package 440A including one or more component differentiations 445A and a package structure 447A, for example, a package structure associated with a deployment package of a version of software (e.g., Software A version 2.0). In certain embodiments, the package structure is a tree structure. In certain embodiments, the package structure is a hierarchical structure.

According to certain embodiments, the computing device 452A and/or the software distribution system 410 is configured to identify one or more missing components associated with the software distribution package 440A. In some embodiments, at least one of the one or more missing components is a component not existing in the repository 454A and/or the cache 456A at the first deployment site 450A. In certain embodiments, at least one of the one or more missing components is a corrupted component in the repository at the first deployment site. In some examples, a corrupted component is not functional (e.g., virus affected). In certain examples, at least one of the one or more missing components is a component (e.g., a specific version of the component, Component B version 5.0) not available at the deployment site 450A. In some embodiments, the computing device 452A and/or the software distribution system 410 is configured to identify the one or more missing components associated with the software distribution package 440A based at least in part upon the package structure. In certain embodiments, at least one of the one or more missing components is not a component associated with the one or more component differentiations 445A. For example, a missing component is a component that is not changed by this deployment after installing the distribution package 440A.

According to some embodiments, the computing device 452A and/or the software distribution system 410 receives deployment information across a plurality of deployment sites (e.g., deployment sites 450). In some embodiments, the deployment information includes a network position of a site, a network bandwidth of a site, a network speed of a site or between two sites, a geographic location of a site, a geographic range of a site, a resource availability (e.g., component availability) of a site, and/or the like. According to some embodiments, the computing device 452A and/or the software distribution system 410 selects a second deployment site 450B from the plurality deployment sites based on the deployment information and the first deployment site 450A. In certain embodiments, the second deployment site 450B is selected based upon one or more selection criteria. In some embodiments, the one or more selection criteria include at least one selected from a group consisting of a network latency, a network bandwidth, a network speed, a geographic location, a geographic range, and a resource availability. In certain embodiments, the second deployment site 450B is a site having at least one of the one or more identified missing components and the lowest network latency. In some embodiments, the second deployment site is a site within a certain geographic area (e.g., a certain region, a certain country, etc.).

In some embodiments, the one or more selection criteria include evaluations of one or more factors including a network distance, a network bandwidth, a network latency, a geographic location, a geographic range, a resource availability, and/or the like. In certain embodiments, the resource availability includes availability of a part of the one or more missing components. In some embodiments, the resource availability refers to availability of all of the one or more missing components.

According to certain embodiments, for example, the computing device 452A and/or the software distribution system 410 requests one or more components for deployment from the second deployment site 450B (e.g., from the computing device 452B at the deployment site 450B). In some embodiments, the one or more requested components from the second deployment site are a subset of the one or more missing components. In certain embodiments, at least one of the one or more missing components is not one of the one or more requested components. In some embodiments, the one or more request components are the same as the one or more missing components.

According to some embodiments, the computing device 452A at the first deployment site 450A receives one or more components from the second deployment site 450B. In certain embodiments, the one or more received components are the same as the one or more requested components. In some embodiments, the one or more received components are different from the one or more requested components. In certain embodiments, at least one of the one or more requested components is not in the one or more received components. In some embodiments, the computing device 452A and/or the software distribution system 410 is configured to request one or more additional components from a third deployment site (e.g., deployment site 450N). In certain embodiments, the computing device 452B at the second deployment site 450B is configured to request one or more components for the first deployment site 450A.

According to some embodiments, the computing device 452A deploys the software distribution package 440A at the first deployment site 450A, using the one or more received components from the second deployment site 450B, the one or more component differentiations 445A, and the package structure 447A.

In some embodiments, the one or more computing devices 452 (e.g., computing device 452A, computing device 452B, . . . , computing device 452N) run and/or deploy the corresponding software distribution packages 440 at the corresponding deployment sites 450.

In some embodiments, the repository 430 and/or the repository 454 can include one or more package structures 442, one or more deployment packages 444 (e.g., one or more versions of software), one or more distribution packages, deployment information of one or more deployment sites, one or more components 436, and/or the like. The repository 430 and/or the repository 454 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the software distribution environment 400 can execute software or firmware stored in non-transitory computer-readable medium to implement various processing steps. Various components and processors of the software distribution environment 400 can be implemented by one or more computing devices, including but not limited to, circuits, a computer, a cloud-based processing unit, a processor, a processing unit, a microprocessor, a mobile computing device, and/or a tablet computer. In some cases, various components of the software distribution environment 400 (e.g., the software distribution system 410, the software distributor 420, the computing devices 452) can be implemented on a shared computing device. Alternatively, a component of the software distribution environment 400 can be implemented on multiple computing devices. In some implementations, various modules and components of the software distribution environment 400 can be implemented as software, hardware, firmware, or a combination thereof. In some cases, various components of the software distribution environment 400 can be implemented in software or firmware executed by a computing device.

Various components of the software distribution environment 400 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 5:
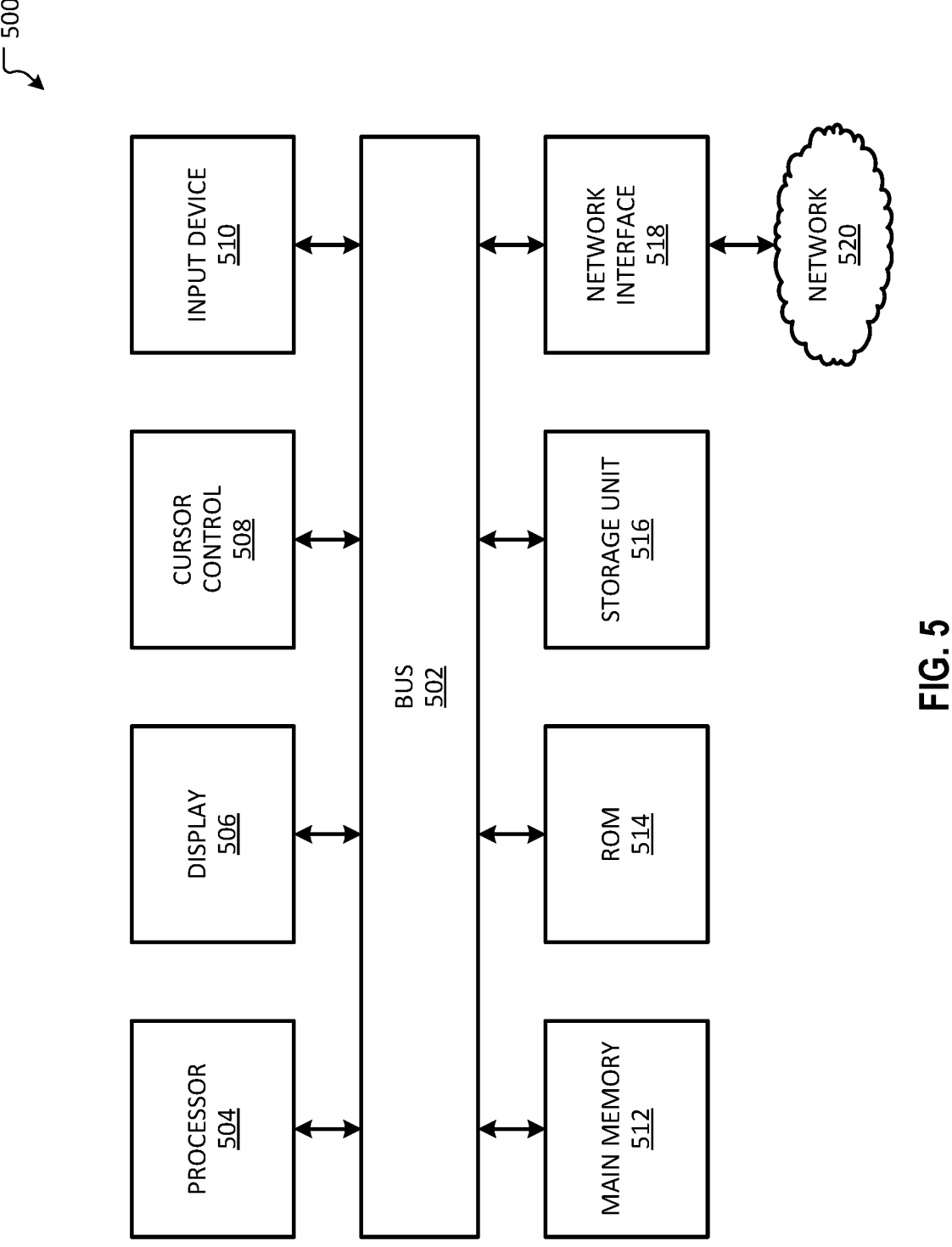
FIG. 5 is a simplified diagram showing a computing system for implementing a system for software distribution according to one embodiment of the present disclosure.

FIG. 5 is a simplified diagram showing a computing system 500 for implementing a system for software distribution according to one embodiment of the present invention. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 100 and/or 200 are performed by the computing system 500. In some examples, the bus 502 is coupled to the processor 504, the display 506, the cursor control component 506, the input device 510, the main memory 512, the read only memory (ROM) 514, the storage unit 516, and/or the network interface 518. In certain examples, the network interface is coupled to a network 520. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 514 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

According to certain embodiments, a method for software distribution, the method includes the steps of: receiving a first deployment package for a first version of software; recursively disassembling the first deployment package into a plurality of components; accessing a set of second components of a second deployment package for a second version of the software, the second version of the software being a previous version of the software; generating one or more component differentiations based at least in part upon the plurality of components associated with first deployment package and the set of second components of the second deployment package, a first component differentiation of the one or more component differentiations being a difference between a first component associated with the first deployment package and a second component in the set of disassembled components of the second deployment package; and generating a distribution package based on the one or more component differentiations and a package structure, the package structure associated with a component structure of the first deployment package. The method is performed using one or more processors. For example, the method is implemented according to at least FIG. 1, FIG. 3, and/or FIG. 4.

In some embodiments, the method includes the step of transmitting the distribution package including the one or more component differentiations and the package structure. In certain embodiments, a second component differentiation of the one or more component differentiations is a new component in the plurality of components associated with the first deployment package, wherein the new component is not in the set of disassembled components of the second deployment package. In some embodiments, the recursively disassembling the first deployment package into a plurality of components comprises: disassembling the deployment package into one or more first level components; and disassembling at least one first level component of the one or more first level components into one or more second level components; wherein each second level component of the one or more second level components is a child component of the at least one first level component.

In certain embodiments, the recursively disassembling the first deployment package into a plurality of components further includes: disassembling at least one of the one or more second level components into one or more atom components; wherein each atom component of the one or more atom components does not have a child component. In some embodiments, the package structure is a tree structure or a hierarchical structure. In some embodiments, the distribution package has a first data size and the deployment package has a second data size, wherein the first data size is smaller than the second data size. In some embodiments, the package structure is generated or updated during the recursively disassembling the first deployment package.

According to some embodiments, a method for soft distribution includes the steps of: receiving, at a first deployment site, a software distribution package including one or more component differentiations and a package structure; identifying, by the computing device, one or more missing components associated with the software distribution package; receiving, at the first deployment site, deployment information across a plurality of deployment sites; selecting, by the computing device, a second deployment site from the plurality of deployment sites based at least in part upon the deployment information across the plurality of deployment sites and the first deployment site; requesting one or more components from the second deployment site; receiving, at the first deployment site, the one or more requested components from the second deployment site; and deploying the software distribution package at the first deployment site, using the one or more received components from the second deployment site, the one or more component differentiations, and the package structure. The method is performed using one or more processors. For example, the method is implemented according to at least FIG. 2, FIG. 3, and/or FIG. 4.

In certain embodiments, at least one of the one or more missing components is a component not existing in a repository at the first deployment site. In some embodiments, at least one of the one or more missing components is a corrupted component in a repository at the first deployment site. In certain embodiments, the selecting, by the computing device, a second deployment site from the plurality of deployment sites includes: selecting the second deployment site based upon one or more selection criteria; wherein the one or more selection criteria include at least one selected from a group consisting of a network latency, a network bandwidth, a geographic location, a geographic range, and a resource availability. In some embodiments, the package structure is a tree structure or a hierarchical structure.

According to certain embodiments, a system for software distribution includes one or more memories having instructions stored therein, and one or more processors configured to execute the instructions and perform operations. The operations include: receiving a first deployment package for a first version of software; recursively disassembling the first deployment package into a plurality of components; accessing a set of second components of a second deployment package for a second version of the software, the second version of the software being a previous version of the software; generating one or more component differentiations based at least in part upon the plurality of components associated with first deployment package and the set of second components of the second deployment package, a first component differentiation of the one or more component differentiations being a difference between a first component associated with the first deployment package and a second component in the set of disassembled components of the second deployment package; and generating a distribution package based on the one or more component differentiations and a package structure, the package structure associated with a component structure of the first deployment package. For example, the system is implemented according to at least FIG. 2, FIG. 3, and/or FIG. 4.

In certain embodiments, the one or more memories include at least one repository selected from a group consisting of: one or more package structures repository configured to store therein a set of package structures, one or more deployment packages repository configured to store therein a set of deployment packages including the first deployment package and the second deployment package, and one or more components repository configured to store therein the plurality of components. In some embodiments, the operations further comprise: transmitting the distribution package including the one or more component differentiations and the package structure. In some embodiments, a second component differentiation of the one or more component differentiations being a new component in the plurality of components associated with the first deployment package, wherein the new component is not in the set of disassembled components of the second deployment package. In some embodiments, the recursively disassembling the first deployment package into a plurality of components comprises: disassembling the deployment package into one or more first level components; and disassembling at least one first level component of the one or more first level components into one or more second level components; wherein each second level component of the one or more second level components is a child component of the at least one first level component. In some embodiments, the recursively disassembling the first deployment package into a plurality of components further comprises: disassembling at least one of the one or more second level components into one or more atom components; wherein each atom component of the one or more atom components does not have a child component.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for software distribution, the method comprising:

receiving a first deployment package including a machine-executable code for a first version of software;

recursively disassembling the first deployment package into a plurality of components until reaching a predetermined level, at least one of the plurality of components being an unpackable component;

accessing a set of second components of a second deployment package for a second version of the software, the second version of the software being a previous version of the software;

generating one or more component differentiations based at least in part upon the plurality of components associated with the first deployment package and the set of second components of the second deployment package, a first component differentiation of the one or more component differentiations being a difference between a first component associated with the first deployment package and a second component in the set of second components of the second deployment package;

generating a distribution package based on the one or more component differentiations and a first package structure, the first package structure associated with a component structure of the first deployment package, the first package structure being different from a second package structure associated with the second deployment package; and deploying the distribution package generated based on the one or more component differentiations and the first package structure at a deployment site;

wherein the method is performed using one or more processors.

2. The method of claim 1, further comprising:

transmitting the distribution package including the one or more component differentiations and the first package structure to the deployment site.

3. The method of claim 1, wherein a second component differentiation of the one or more component differentiations being a new component in the plurality of components associated with the first deployment package, wherein the new component is not in the set of second components of the second deployment package.

4. The method of claim 1, wherein the recursively disassembling the first deployment package into the plurality of components comprises:

disassembling the first deployment package into one or more first level components; and disassembling at least one first level component of the one or more first level components into one or more second level components;

wherein each second level component of the one or more second level components is a child component of the at least one first level component.

5. The method of claim 4, wherein the recursively disassembling the first deployment package into the plurality of components further comprises:

disassembling at least one of the one or more second level components into one or more atom components;

wherein each atom component of the one or more atom components does not have a child component.

6. The method of claim 1, wherein the first package structure is a tree structure or a hierarchical structure.

7. The method of claim 1, wherein the distribution package has a first data size and the first deployment package has a second data size, wherein the first data size is smaller than the second data size.

8. The method of claim 1, wherein the first package structure is generated or updated during the recursively disassembling the first deployment package.

9. A system for software distribution, the system comprising:

one or more memories having instructions stored therein; and one or more processors configured to execute the instructions and perform operations comprising:

receiving a first deployment package for a first version of software;

recursively disassembling the first deployment package including a machine-executable code into a plurality of components until reaching a predetermined level, at least one of the plurality of components being an unpackable component;

accessing a set of second components of a second deployment package for a second version of the software, the second version of the software being a previous version of the software;

generating one or more component differentiations based at least in part upon the plurality of components associated with first deployment package and the set of second components of the second deployment package, a first component differentiation of the one or more component differentiations being a difference between a first component associated with the first deployment package and a second component in the set of second components of the second deployment package;

generating a distribution package based on the one or more component differentiations and a first package structure, the first package structure associated with a component structure of the first deployment package, the first package structure being different from a second package structure associated with the second deployment package; and deploying the distribution package generated based on the one or more component differentiations and the first package structure at a deployment site.

10. The system of claim 9, wherein the one or more memories include at least one repository selected from the group consisting of:

one or more package structures repository configured to store therein a set of package structures, one or more deployment packages repository configured to store therein a set of deployment packages including the first deployment package and the second deployment package, and one or more components repository configured to store therein the plurality of components.

11. The system of claim 9, the operations further comprising:

transmitting the distribution package including the one or more component differentiations and the first package structure to the deployment site.

12. The system of claim 9, wherein a second component differentiation of the one or more component differentiations being a new component in the plurality of components associated with the first deployment package, wherein the new component is not in the set of second components of the second deployment package.

13. The system of claim 9, wherein the recursively disassembling the first deployment package into the plurality of components comprises:

disassembling the first deployment package into one or more first level components; and disassembling at least one first level component of the one or more first level components into one or more second level components;

wherein each second level component of the one or more second level components is a child component of the at least one first level component.

14. The system of claim 13, wherein the recursively disassembling the first deployment package into the plurality of components further comprises:

disassembling at least one of the one or more second level components into one or more atom components;

wherein each atom component of the one or more atom components does not have a child component.

* * * * *